Oct. 25, 1966

W. KIRCHNER 3,281,862

DEVICE FOR RECORDING A CONTINUOUS TRACE
OF A SUCCESSION OF MEASURED VALUES

Original Filed April 18, 1963

Willi Kirchner
INVENTOR

BY Stevens, Davis
Miller & Mosher
ATTORNEY

United States Patent Office 3,281,862
Patented Oct. 25, 1966

3,281,862
DEVICE FOR RECORDING A CONTINUOUS TRACE OF A SUCCESSION OF MEASURED VALUES
Willi Kirchner, Schwebheim, Obere Heide, Germany, assignor to Kugelfischer Gerog Schafer & Co., Schweinfurt, Germany
Original application Apr. 18, 1963, Ser. No. 273,921. Divided and this application Aug. 12, 1965, Ser. No. 479,087
Claims priority, application Germany, Apr. 19, 1962, K 46,534
3 Claims. (Cl. 346—112)

This application is a division of my U.S. application Serial No. 273,921, filed April 18, 1963.

This invention relates to a device for recording a continuous trace of a succession of measured values whereby the recorded trace is produced by the pressure exerted on a suitable recording medium by a recording member.

In many applications of the use of recording devices to measure the quality of workpieces being produced or to record test results, it is not sufficient to have only the recorded instantaneous values of measured quantities as indicated by instruments. Such a record will not afford the required full interpretation of the measured values of test results as a function of time. What is actually required for subsequent interpretation of measured values or test results is a permanent record of a continuous succession of readings. An example of such an application in which recording instruments are used almost exclusively is the continuous testing of the surface as well as the shape of workpieces. For this testing, a suitable recording system essentially includes a recording mechanism, a measuring system driving the recording mechanism, and a pick-up receiving signals indicating the magnitude of the quantity to be measured. The pickup in most cases is arranged to amplify said signals before they are transmitted to the measuring system. There have already been proposed a variety of recording mechanisms including, for example, ink recorders, light spot recorders, spark recorders, recorders using a heated stylus co-operating with wax paper, etc. However, each of these systems or mechanisms has its inherent drawbacks. In an ink recorder, for example, the capillary recording pens are prone to clogging. A drawback of other systems or mechanisms is to be seen in the fact that they require the use of expensive or special recording media such as photographic paper, wax paper, spark recording paper and the like. In still another system the drawback of using an expensive recording medium is avoided by the use of plain note paper in conjunction with carbon paper. In this system, the two sheets are simultaneously drawn over an edge, and the movable needle of the measuring system is urged against the edge, thus causing the carbon paper to produce an impression of the note paper strip. One drawback of this system lies in the fact that the movable needle is subject to considerable static friction. Attempts have been made to cause the needle to vibrate and thus to eliminate the effect of static friction. However, the vibrating needle produces a very broad record trace rendering small differences in the magnitude of the measured quantity indistinguishable.

According to the present invention, the aforementioned drawbacks of the recorders in which a succession of values is recorded by the pressure of a recording member against the record carrier is avoided by providing for the pressure required to make a record to be produced by a freely movable ball supported by an air cushion. According to a specific feature of the invention, the ball producing the recording pressure is disposed, with a certain amount of clearance, in a tubular stylus member extending perpendicular to the recording medium and mounted for rotation about an axis extending at right angles to the direction of the recording pressure, the arrangement of the ball being such that the compressed air introduced into the tubular stylus member not only flows past the ball but also urges the ball against the recording medium. It is convenient to use a conduit for supplying the compressed air, which conduit is not in physical contact with the tubular stylus member.

Other objects and features of the invention will become apparent as the description proceeds, especially when taken in conjunction with the accompanying drawings, illustrating a preferred embodiment of the invention, wherein.

Figure 1:
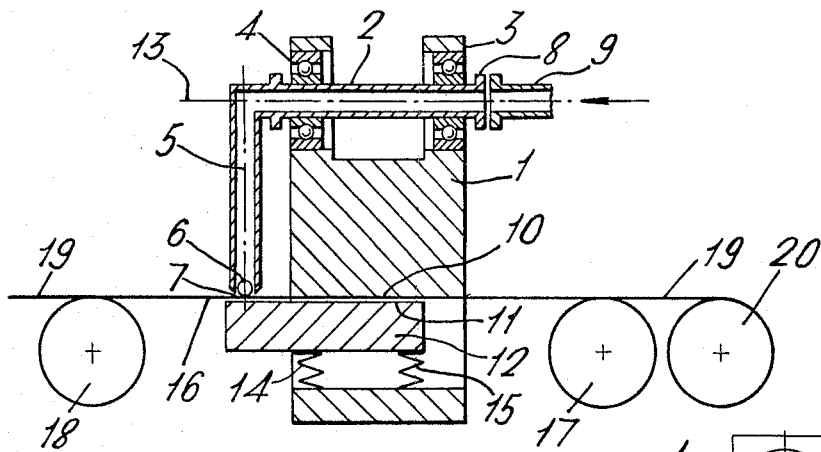
FIG. 1 is a diagrammatic longitudinal cross-sectional view of the device of the invention.
Figure 2:
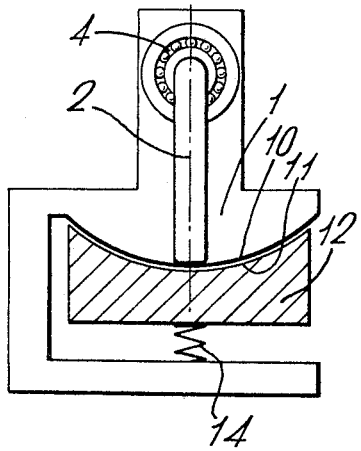
FIG. 2 shows the front view of the device of FIG. 1.

As will be seen in FIG. 1, an angular stylus member 2 is supported for rotation in two ball bearings 3 and 4 mounted in a frame member 1. Disposed in the bore 5 of the stylus member 2 is a recording member in the form of a ball 6, part of the ball projecting from the lower end 7 of the stylus member. The diameter of ball 6 is slightly smaller than that of bore 5. Adjacent to the rear end 8 of the stylus member 2 is a tube 9 serving to introduce compressed air into the stylus member, the compressed air urging the ball 6 against the recording medium to produce a trace. In order to avoid distortion of the record trace, such as might occur when there were a physical connection between the tube 9 and the stylus member 2 so that additional turning moments could be imposed on the stylus member, it is preferred to introduce the compressed air from the tube 9 into the stylus member 2 in such a manner as to avoid physical contact between the members 9 and 2. Tube 9 is mounted so as to provide an open connection with stylus member 2. The under side 10 of frame 1 and the upper side 11 of a member 12 supporting the recording medium are formed as part-cylindrical surfaces whose common axis coincides with the pivotal axis 13 of stylus member 2. Compression springs 14 and 15 urge the supporting member 12 towards the under side 10 of frame 1. The recording medium is guided between the under side 10 of frame 1 and the upper side 11 of supporting member 12. The recording medium comprises an elongated sheet of carbon paper 16 which is fed from a reel 17 to a reel 18, and an elongated sheet of writing paper 19 which is pulled off a reel 20. The drive means for the recording medium is not shown and will not be described, as it forms no part of the invention.

The aforedescribed device operates as follows: The air under pressure introduced into the stylus member 2 from tube 9 urges ball 6 against the writing paper strip 19 supported by the upper side 11 of supporting member 12. Part of the air under pressure flows past ball 6 so that the ball is supported in an almost frictionless manner by an air cushion. Then the stylus member is pivoted about its pivotal axis 13 by a driving force produced by any suitable measuring mechanism, and when the record carrier 16, 19 is simultaneously fed past the stylus member, the ball 6 which is loaded by the pressure of the air flow will roll on the paper strip 19 and will produce a chart or record of the continuous succession of test values.

The measuring mechanism driving the stylus member 2 may be of the mechanical type or of the electric type. It is particularly convenient to use a pneumatic measuring mechanism in view of the fact that air under pressure must be available in any event for the operation of the recording mechanism. The pneumatic measuring mechanism is operated by a pneumatic pickup. Preferably, use is made of a pickup incorporating a jet or nozzle, as the large air output of such a pickup ensures rapid response of the measuring mechanism and thus permits the recording of rapidly varying test data.

Figure 3:
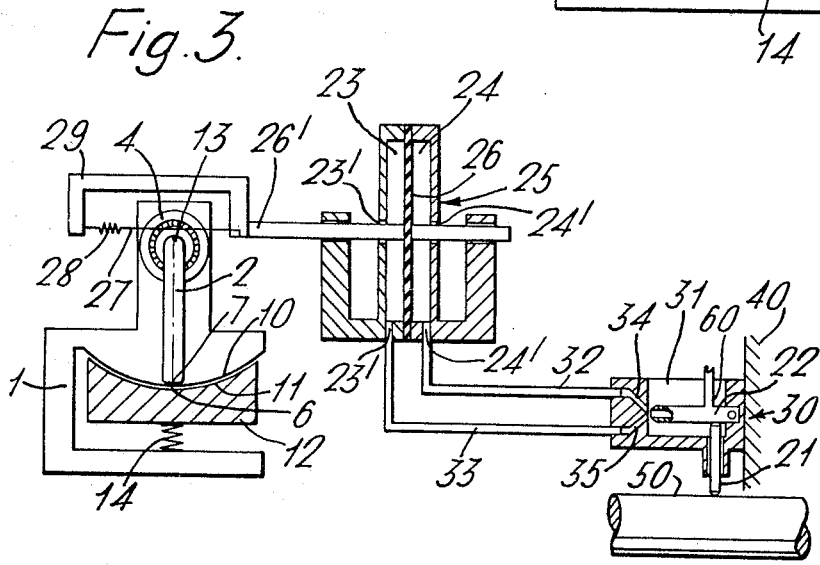
FIG. 3 shows the device of FIG. 1 in conjunction with a pneumatic measuring system and a nozzle-type pickup, the two units being shown in longitudinal section.

In the arrangement shown in FIGURE 3, a feeler pin 21 is slidably mounted in a pneumatic sensing mechanism 30 which is positioned on a frame 10 by means not shown over the work being measured. The pin 21 serves to measure the quantity under consideration, for example the surface of a shaft 50 being passed beneath said feeler but in contact therewith. The feeler pin is in contact with a nozzle 22 pivotally mounted in a pneumatic sensing chamber 31 which is open to the atmosphere. The nozzle is connected by a conduit 60 with a source of compressed air (not shown). The sensing chamber 31 is connected to a pneumatic measurement transmitting mechanism 25, positioned in a stationary manner adjacent to the recording device, by conduits 32 and 33 (shown in elevation) having inlet ports 34 and 35 respectively and being connected to the said transmitting mechanism 25 by ports 24' and 23' respectively. As shown, the nozzle 22 is directing an equal flow of air into inlet ports 34 and 35. Movement of feeler 21 up or down will produce the same movement in nozzle 22. The upward movement of nozzle 22 will increase the flow into inlet 34 and decrease the flow into inlet 35. The downward movement of nozzle 22 will have the reverse effect. Thus, depending on the position of nozzle 22, different pressures are developed in the chambers 23 and 24 of the said transmitting mechanism 25. This difference in pressure acts on the flexible diaphragm 26 and causes a corresponding lateral displacement of needle valve 26'. Pressure discharge from chambers 23 and 24 occurs at the respective openings 23' and 24' provided for the valve 26'. The movement of valve 26' causes a corresponding angular motion of the stylus member 2 to which the needle valve is connected by means of a ribbon 27. The movement of member 2 is perpendicular to the recording medium but lateral to the direction of movement of the medium. The ribbon 27 is wrapped around the horizontal arm of the stylus member, and it is tensioned by a spring 28 inserted in the ribbon. Both ends of the ribbon are attached to a yoke 29 which is in turn rigidly secured to the needle valve 26'. The means for guiding the yoke 29 is not shown in the drawings and is not a part of the invention.

The ball 6 is maintained in continuous contact with the recording medium. Thus the lateral movement of the stylus member 2 in response to a movement of yoke 20 as it is actuated by valve 26' in response to the movement of pin 21 causes a deviation in trace being made upon the recording medium by the ball 6. The record thus made on the medium is a continuous trace showing all measurements including deviations from the established norm as the measurements made by pin 21 have directed.

I claim:

1. A device for recording a continuous trace of a succession of measured values on a recording medium, comprising an arcuate surface means for supporting said recording medium passing thereover, an angularly shaped tubular member positioned above said arcuate surfaced means, one leg of said member being perpendicular to said arcuate surfaced means, the other leg of said member being horizontal and pivotally mounted whereby the axis of said arcuate surfaced means coincides with the pivotal axis of said tubular member, a spherical recording member freely positioned in said vertical leg and partially protruding from the lower end thereof into continuous recording contact with said recording medium passing over said arcuate surfaced means, said recording member further being of a diameter less than the bore of said vertical leg, and means for supplying compressed air to said horizontal leg of said tubular member positioned adjacent to the end of said leg but not in contact therewith.

2. A device for recording a continuous trace of a succession of measured values on a recording medium comprising a frame, an angular stylus member pivotally mounted about a horizontal portion on the upper part of said frame, said stylus member having a depending portion thereon, a spherical recording member disposed in said depending portion of said stylus member and partially projecting therefrom, said spherical member being of a diameter less than that of the bore of said depending portion, a compressed air inlet tube positioned adjacent, but not in contact with, that end of said stylus member opposite the end containing said spherical member and a recording medium support positioned on said frame beneath said dependent portion, said support comprising a member having a concave upper surface, the axis of which surface coincides with the pivotal axis of said stylus member, and compression springs positioned on said frame beneath said support to urge said support upward toward a portion of said frame having a convex lower surface fitting said concave surface, said arcuate surfaces guiding said recording medium for passage under said recording member but in continuous tracing contact therewith.

3. A device for recording a continuous trace of a succession of measured values on a recording medium, comprising an arcuate surface means for supporting said recording medium passing thereover, an angularly shaped tubular member positioned above said arcuate surfaced means, one leg of said member being perpendicular to said arcuate surface means, the other leg of said member being horizontal and pivotally mounted whereby the axis of said arcuate surfaced means coincides with the pivotal axis of said tubular member, a spherical recording member freely positioned in said vertical leg and partially protruding from the lower end thereof into continuous recording contact with said recording medium passing over said arcuate surfaced means, said recording member further being of a diameter less than the bore of said vertical leg, means for supplying compressed air to said horizontal leg of said tubular member positioned adjacent to the end of said leg but not in contact therewith, a sensing means to measure values, a pneumatic measurement transmitting mechanism actuated by said measuring means and interconnecting said sensing means and said tubular member to cause said member to be moved about its pivotal axis.

References Cited by the Examiner

UNITED STATES PATENTS 2,139,508 12/1938 Marcellus _____ 346—75
2,484,298 10/1949 Krahulec _____ 346—139
3,051,956 8/1962 Theobald _____ 346—141
3,149,901 9/1964 Hagelbarger _____ 346—77

RICHARD B. WILKINSON, *Primary Examiner.*

LOUIS J. CAPOZI, *Examiner.*

J. W. HARTARY, *Assistant Examiner.*